UNITED STATES PATENT OFFICE 2,268,648

TREATMENT OF ARTIFICIAL FILAMENTS, YARNS, AND OTHER MATERIALS MADE OF CELLULOSE DERIVATIVES

Henry Dreyfus, London, England

No Drawing. Application October 3, 1939, Serial No. 297,678. In Great Britain October 8, 1938

2 Claims. (Cl. 8—129)

This invention relates to improvements in the treatment of artificial materials, and particularly in the treatment of artificial filaments, yarns and other materials made of cellulose acetate or other organic derivative of cellulose.

I have discovered that the properties of materials made of organic derivatives of cellulose, particularly of filaments, yarns, foils and similar materials, including yarn in fabric form, may be improved by reacting the materials with carbonyl chloride or other polybasic inorganic acid halide at an elevated temperature. By the process of the present invention the ironing point and melting point of the materials may be increased and the materials may also be rendered insoluble in common organic solvents, for example acetone and chloroform. This insolubility facilitates after-treatment of the materials with organic solvents, as for example in dry cleaning operations. Substantially better results can be obtained by using elevated temperatures than when treatment with the acid halides is effected at comparatively low temperatures, e. g. atmospheric temperature.

The preferred method of carrying out the process consists in a treatment of the materials with carbonyl chloride or other inorganic acid halide in the presence of a suitable diluent at a temperature above 100°, and particularly about 120–140° C. In general treatment for about 2–6 hours is sufficient to effect a substantial increase in melting point and ironing temperature, e. g. an increase of 20° C. or more, and to render the materials insoluble or substantially insoluble in common organic solvents. For example cellulose acetate yarn in hank or fabric form, freed from oil by scouring and/or treatment with a suitable solvent, may be immersed in boiling toluene or xylene in a reflux apparatus and carbonyl chloride bubbled through until the desired improvement in properties has been obtained. The product is then thoroughly washed to free it from hydrogen chloride and constituents of the reaction mixture. The hydrogen chloride in the gas emerging from the apparatus may be separated and the carbonyl chloride returned to the apparatus. A basic substance, for example pyridine or quinoline, or a metal salt, e. g. ferric, zinc, stannic or aluminium chloride, which has a catalytic action, may be present during the reaction.

The process is applicable to materials made of organic derivatives of cellulose, for example cellulose propionate, cellulose butyrate, and ethyl, propyl and benzyl celluloses, but it is particularly valuable for the treatment of cellulose acetate materials. The organic derivatives of cellulose may contain a high proportion of substituent groups, as in commercial acetone-soluble cellulose acetate, of a medium or low proportion. For example cellulose acetate obtained by the partial saponification of commercial acetone-soluble cellulose acetate may be treated.

The process is not confined to the use of carbonyl chloride to react with the materials, though this appears to be the most suitable substance. For example phosphorus oxychloride, thiocarbonyl chloride, thionyl chloride or sulphuryl chloride may be employed.

Example I

A cellulose acetate woven fabric is treated for about 6 hours at 140° C. in 50 times its weight of xylene through which carbonyl chloride is continuously bubbled. At the end of this time a product is obtained which has a substantially increased safe ironing point and melting point and is substantially insoluble in common organic solvents such as acetone, glacial acetic acid and chloroform.

Example II

A cellulose acetate woven fabric is treated for about 3 hours at 110° C. in 50 times its weight of a bath containing 4% of thionyl chloride, 2% pyridine and 94% toluene, under such conditions that the hydrogen chloride formed can escape from the bath. Products having similar properties to those of the products in Example I are thus obtained.

Having described my invention, what I desire to secure by Letters Patent is:

1. Process for the treatment of artificial filaments, foils and similar materials containing an organic derivative of cellulose, comprising reacting them with carbonyl chloride at a temperature 120 to 140° C.

2. Process for the treatment of artificial filaments, foils and similar materials containing cellulose acetate, comprising reacting them with carbonyl chloride at a temperature of 120–140° C.

HENRY DREYFUS.